N. GOTTEN.
Shovel-Plow.
No. 60,879.
Patented Jan 1. 1867
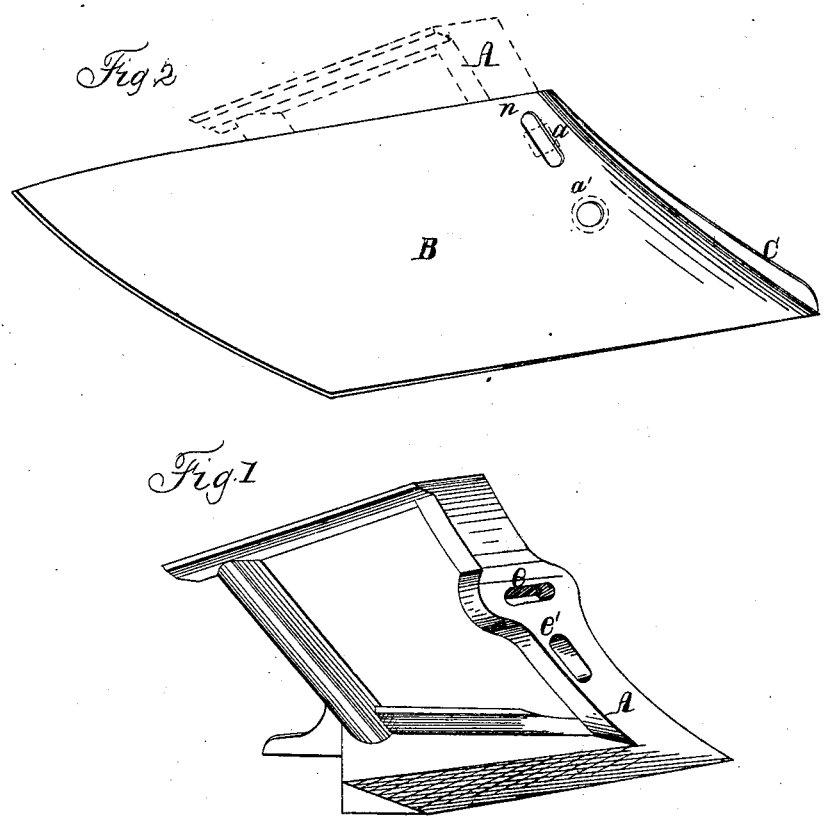

United States Patent Office.

NICHOLAS GOTTEN, OF UNION DEPOT, TENNESSEE.

Letters Patent No. 60,879, dated January 1, 1867.

---

IMPROVEMENT IN COTTON CULTIVATOR.

---

The Schedule referred to in these Letters Patent and making part of the same.

---

TO ALL WHOM IT MAY CONCERN:

Be it known that I, NICHOLAS GOTTEN, of Union Depot, in the county of Shelby, and State of Tennessee, have invented a new and improved Cotton Scraper; and I do hereby declare that the following is a full, clear, and exact description thereof, reference being had to the accompanying drawings, and to the letters of reference marked thereon, forming a part of this specification.

The nature of my invention consists in constructing a cotton scraper in such a manner that the scraper may be adjusted to different angles and depths upon the frame, as the nature of the work may require. It is well known that a different implement is employed among cotton growers to cultivate cotton from that used for other plants. The implement used for cotton, being termed a cotton scraper, has something the resemblance of the common plough, but neither practically answers the purpose of the other.

To enable others skilled in the art to make and use my invention, I will proceed to describe its construction and operation.

Figure 1 is a front elevation of the frame of my improved cotton scraper, with the scraper removed.

Figure 2 is a front elevation of the same, with the scraper attached.

Letters of like name and kind refer to like parts in each of the figures.

A represents the frame of my improved cotton scraper, made of cast iron or other suitable metal, in proper form to receive the scraper, as shown in the drawings. B is the mould-board or scraper secured to the frame A, by means of screw-bolts $a\ a$, passing through holes in the mould-board or scraper, and corresponding holes in the frame A. The holes or slots $e\ e'$ in the frame are made in this manner, so that the scraper B may be changed so as to vary the angles and depth to the ground. These slots, $e\ e'$, stand at right angles with each other, so that the rear point or end of the scraper will turn upon the lower bolt, by which means the rear end of the scraper B may be elevated or lowered, as may be desired. In the upper edge of the scraper is also a slot, $n$, so as to allow the scraper B to move up and down upon the bolts $a\ a'$, the bolt $a'$ moving with the scraper in the lower slot $e'$. Thus it will be seen that the scraper can be elevated or lowered, and its depth regulated by the lower portion of the frame A, that runs upon the ground and gauges the depth of the scraper B. At the front inclined edge of the scraper B is a curved flange, C, increasing in width as it descends toward the ground. The scraper B is made of steel plate, cut out in diamond form, slightly concave, and secured to the frame, as before described. The frame A, together with the scraper B, is secured to a wooden beam by means of screw bolts or by any other well-known means.

Having thus described my invention, I claim as new, and desire to secure by Letters Patent—

1. The frame A, provided with the slots $a\ a'$, being at right angles in combination with the scraper B, so that the scraper B may be adjusted and secured at different angles, to the frame A, substantially as shown and described, and for the purposes set forth.

2. I claim the peculiar construction of the frame A, with the lower portion running upon the ground, so as to form a gauge for the scraper, substantially as shown and described.

The above specification of my invention signed by me this        day of        , 1866.

NICHOLAS GOTTEN.

Witnesses:
A. MUNN,
H. L. PRIDDY,
J. F. HOLLAWAY,
D. W. THOMAS,
G. M. BARTLETT.